United States Patent
Hutton et al.

(10) Patent No.: US 11,757,735 B2
(45) Date of Patent: Sep. 12, 2023

(54) METHOD AND SYSTEM FOR FACILITATING AN AUDIT OF EVENT-BASED BUSINESS PROCESSES

(71) Applicant: JPMorgan Chase Bank, N.A., New York, NY (US)

(72) Inventors: James Alexander Hutton, Wilmington, DE (US); Ann M Knackstedt, Wilmington, DE (US); Olutayo Ibikunle, Upper Montclair, NJ (US); Ryan M Beckett, Newark, DE (US); Lori-Ann Newnam, Thornton, PA (US); Marlon Detorres, Bear, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 267 days.

(21) Appl. No.: 17/034,755

(22) Filed: Sep. 28, 2020

(65) Prior Publication Data

US 2022/0103439 A1    Mar. 31, 2022

(51) Int. Cl.
| | |
|---|---|
| *H04L 41/50* | (2022.01) |
| *G06Q 10/067* | (2023.01) |
| *H04L 41/5009* | (2022.01) |
| *G06Q 10/0633* | (2023.01) |
| *G06Q 10/0639* | (2023.01) |
| *H04L 67/55* | (2022.01) |
| *H04L 67/61* | (2022.01) |

(52) U.S. Cl.
CPC ....... *H04L 41/5096* (2013.01); *G06Q 10/067* (2013.01); *G06Q 10/0633* (2013.01); *G06Q 10/06395* (2013.01); *H04L 41/5009* (2013.01); *H04L 67/55* (2022.05); *H04L 67/61* (2022.05)

(58) Field of Classification Search
CPC ............. H04L 41/5096; H04L 41/5009; H04L 67/322; G06Q 10/0633; G06Q 10/067
See application file for complete search history.

(56) References Cited

U.S. PATENT DOCUMENTS

| | | | |
|---|---|---|---|
| 2004/0068501 A1* | 4/2004 | McGoveran | G06Q 30/06 714/E11.131 |
| 2005/0246186 A1* | 11/2005 | Nikolov | G06Q 10/107 709/206 |
| 2005/0261914 A1* | 11/2005 | Brookins | G06Q 10/063 705/7.11 |

(Continued)

*Primary Examiner* — Chris Parry
*Assistant Examiner* — Hassan A Khan
(74) *Attorney, Agent, or Firm* — Greenblum & Bernstein, P.L.C.

(57) ABSTRACT

A method for facilitating an audit of an event-based business process is provided. The method includes identifying an application in the event-based business process; initiating a subscription with the identified application; recording a published event based on the subscription; correlating, by using a correlation identifier, the recorded published event with the event-based business process, the correlation identifier including a value that references an event chain; and storing, in a memory, the correlated published event based on an event sourcing pattern. The method further includes determining, by using the correlated published event, an anomaly in the event-based business process; and displaying, via a graphical user interface, a notification that includes information relating to the anomaly and a recommended compensating action.

20 Claims, 10 Drawing Sheets

(56) References Cited

U.S. PATENT DOCUMENTS

| | | | |
|---|---|---|---|
| 2007/0165625 A1* | 7/2007 | Eisner | H04L 67/561 370/389 |
| 2008/0189388 A1* | 8/2008 | Khare | G06F 16/335 709/224 |
| 2009/0138895 A1* | 5/2009 | Dumas | G06Q 10/06 719/315 |
| 2011/0047032 A1* | 2/2011 | Kumar | G06Q 30/02 705/14.66 |
| 2012/0078674 A1* | 3/2012 | Goel | G06Q 10/067 705/7.15 |
| 2012/0215872 A1* | 8/2012 | Beardsmore | H04L 51/214 709/207 |
| 2014/0098758 A1* | 4/2014 | Cheng | H04L 69/14 370/329 |
| 2015/0120854 A1* | 4/2015 | Bhat | H04L 51/226 709/207 |
| 2017/0236188 A1* | 8/2017 | Puck | G06Q 30/0635 705/26.81 |
| 2017/0257303 A1* | 9/2017 | Boyapalle | H04L 67/1001 |
| 2017/0351542 A1* | 12/2017 | Robinson | G06F 9/466 |
| 2018/0349482 A1* | 12/2018 | Oliner | H04L 41/22 |
| 2018/0373617 A1* | 12/2018 | Gaier | G06F 11/3616 |
| 2019/0052549 A1* | 2/2019 | Duggal | H04L 41/5019 |
| 2020/0067952 A1* | 2/2020 | Deaguero | H04L 43/16 |
| 2020/0076677 A1* | 3/2020 | Mermoud | H04L 41/0631 |
| 2020/0092180 A1* | 3/2020 | Bajaj | H04L 67/535 |
| 2020/0228418 A1* | 7/2020 | Chaloupka | G06F 16/2358 |
| 2020/0382361 A1* | 12/2020 | Chandrasekhar | G06N 3/044 |
| 2021/0385124 A1* | 12/2021 | Roy | H04L 43/0823 |

* cited by examiner

METHOD AND SYSTEM FOR FACILITATING AN AUDIT OF EVENT-BASED BUSINESS PROCESSES

BACKGROUND

1. Field of the Disclosure

This technology generally relates to methods and systems for facilitating an audit of a business process, and more particularly to methods and systems for facilitating an audit of a business process in an event-based microservices environment via an independent auditor microservice.

2. Background Information

Many business entities utilize Domain Driven Design (DDD) software engineering practices to decompose a business process into a set of interactions that may be implemented in a distributed architecture such as, for example, a microservices architecture. The business process may include long running transactions that use a message-driven approach for executing a sequence of local transactions. Generally, processing in a distributed, event-based environment includes significant challenges with respect to ensuring successful completion of the entire business process.

One challenge of using conventional forms of system monitoring is that in many instances, the system monitoring may only address issues with system components. As a result, data consistency for the business process may not be adequately monitored across the various microservices. In addition, end-to-end auditing and failure management for long running transactions in the business process when an inconsistency is discovered may be difficult due to the distributed architecture.

Therefore, there is a need for an independent microservice a captures all published events in a business process, applies logic to the published events to detect data anomalies, and publishes compensating actions to resolve the detected data anomalies.

SUMMARY

The present disclosure, through one or more of its various aspects, embodiments, and/or specific features or sub-components, provides, inter alia, various systems, servers, devices, methods, media, programs, and platforms for facilitating an audit of a business process in an event-based microservices environment via an independent auditor microservice.

According to an aspect of the present disclosure, a method for facilitating an audit of an event-based business process is provided. The method may be implemented by at least one processor. The method may include identifying at least one application in the event-based business process; initiating a subscription with the identified at least one application; recording at least one published event based on the subscription; correlating, by using a correlation identifier, the recorded at least one published event with the event-based business process, the correlation identifier may include a value that references an event chain; and storing, in a memory, the correlated at least one published event based on an event sourcing pattern.

In accordance with an exemplary embodiment, the method may further include determining, by using the correlated at least one published event, at least one anomaly in the event-based business process; and displaying, via a graphical user interface, a notification that includes information relating to the at least one anomaly and a recommended compensating action.

In accordance with an exemplary embodiment, at least one compensating event corresponding to the recommended compensating action may be automatically published to the at least one application to resolve the at least one anomaly.

In accordance with an exemplary embodiment, the event-based business process may include at least one saga transaction, and the at least one saga transaction may include a long-running transaction that utilizes an asynchronous messaging technique to execute a sequence of local transactions.

In accordance with an exemplary embodiment, at least one saga pattern may be utilized to execute a forward transaction and to execute a forward compensating transaction for the at least one saga transaction, and the at least one saga pattern may include at least one from among a choreography pattern and a coordination pattern.

In accordance with an exemplary embodiment, the at least one application may include at least one from among a monolithic application and a microservice application, and the microservice application may include at least one aggregate.

In accordance with an exemplary embodiment, the at least one aggregate may include a plurality of objects that perform a business use case.

In accordance with an exemplary embodiment, the at least one published event may include a transition in operating state of the at least one application in the event-based business process.

In accordance with an exemplary embodiment, the at least one processor may be encoded with at least one from among a predetermined sequence of events to complete the event-based business process, a service level agreement (SLA) of the at least one published event, a service level objective (SLO) of the at least one published event, a SLA for completing the event-based business process, and a SLO for completing the event-based business process.

In accordance with an exemplary embodiment, the event sourcing pattern may include at least one data storage technique that enables reconstruction of an operating state of the at least one application based on the recorded at least one published event.

According to an aspect of the present disclosure, a computing device configured to implement an execution of a method for facilitating an audit of an event-based business process is disclosed. The computing device comprising a processor; a memory; and a communication interface coupled to each of the processor and the memory, wherein the processor may be configured to identify at least one application in the event-based business process; initiate a subscription with the identified at least one application; record at least one published event based on the subscription; correlate, by using a correlation identifier, the recorded at least one published event with the event-based business process, the correlation identifier may include a value that references an event chain; and store, in the memory, the correlated at least one published event based on an event sourcing pattern.

In accordance with an exemplary embodiment, the processor may be further configured to determine, by using the correlated at least one published event, at least one anomaly in the event-based business process; and display, via a graphical user interface, a notification that includes information relating to the at least one anomaly and a recommended compensating action.

In accordance with an exemplary embodiment, the processor may be further configured to automatically publish at least one compensating event to the at least one application to resolve the at least one anomaly, and the at least one compensating event may correspond to the recommended compensating action.

In accordance with an exemplary embodiment, the event-based business process may include at least one saga transaction, and the at least one saga transaction may include a long-running transaction that utilizes an asynchronous messaging technique to execute a sequence of local transactions.

In accordance with an exemplary embodiment, the processor may be further configured to utilize at least one saga pattern to execute a forward transaction and to execute a forward compensating transaction for the at least one saga transaction, and the at least one saga pattern may include at least one from among a choreography pattern and a coordination pattern.

In accordance with an exemplary embodiment, the at least one application may include at least one from among a monolithic application and a microservice application, and the microservice application may include at least one aggregate.

In accordance with an exemplary embodiment, the at least one aggregate may include a plurality of objects that perform a business use case.

In accordance with an exemplary embodiment, the at least one published event may include a transition in operating state of the at least one application in the event-based business process.

In accordance with an exemplary embodiment, the processor may be further configured to encode at least one from among a predetermined sequence of events to complete the event-based business process, a service level agreement (SLA) of the at least one published event, a service level objective (SLO) of the at least one published event, a SLA for completing the event-based business process, and a SLO for completing the event-based business process.

In accordance with an exemplary embodiment, the event sourcing pattern may include at least one data storage technique that enables reconstruction of an operating state of the at least one application based on the recorded at least one published event.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
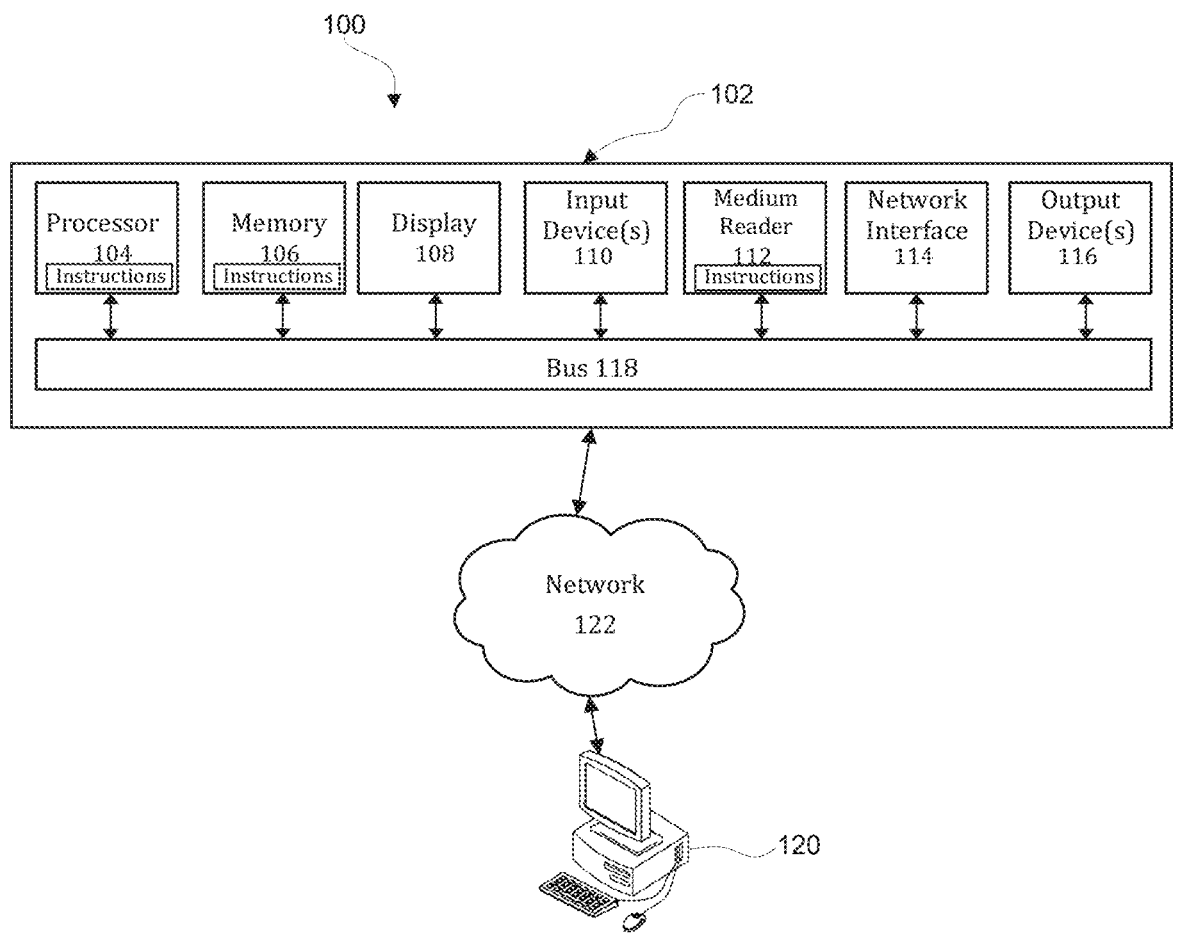
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating an audit of a business process in an event-based microservices environment via an independent auditor microservice.

Figure 2:
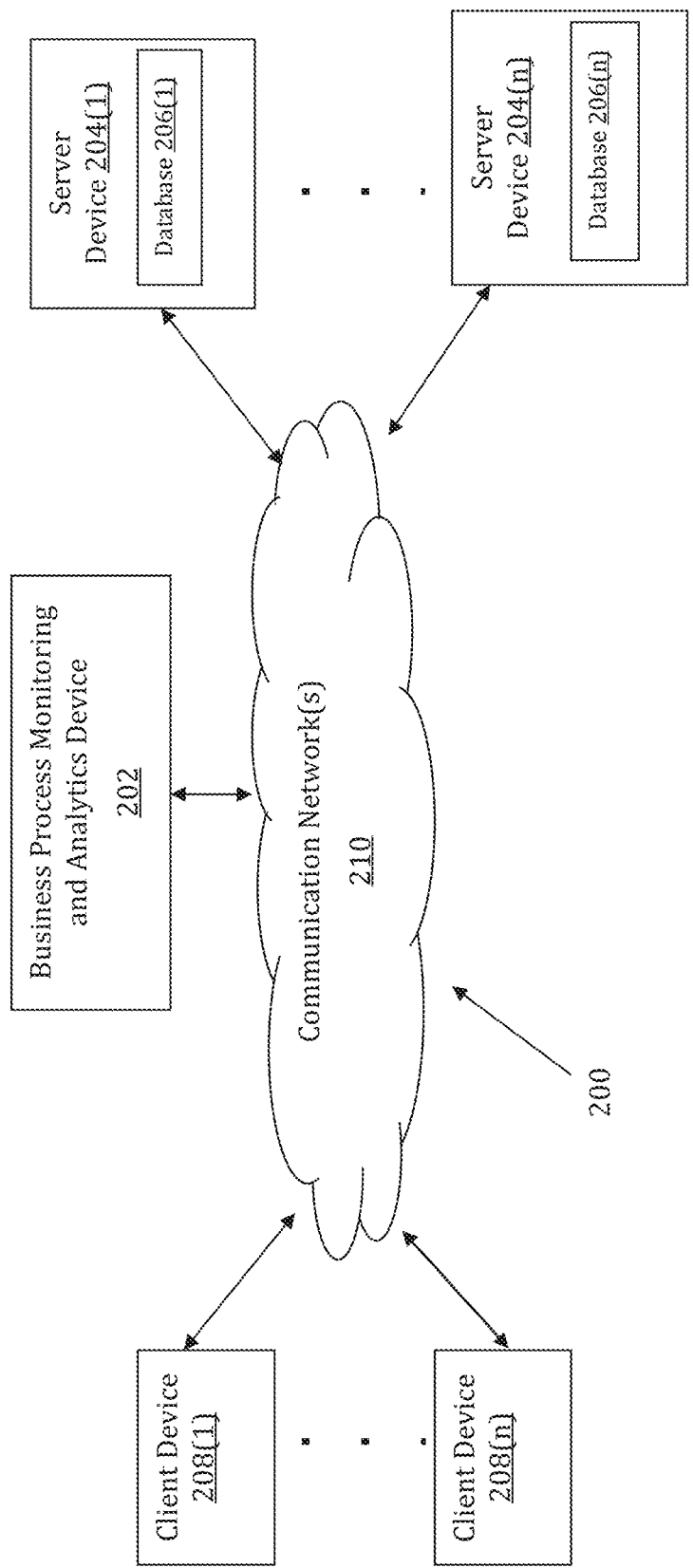
FIG. 2 illustrates an exemplary diagram of a network environment.

Referring to FIG. 2, a schematic of an exemplary network environment 200 for implementing a method for facilitating an audit of a business process in an event-based microservices environment via an independent auditor microservice is illustrated. In an exemplary embodiment, the method is executable on any networked computer platform, such as, for example, a personal computer (PC).

The method for facilitating an audit of a business process in an event-based microservices environment via an independent auditor microservice may be implemented by a Business Process Monitoring and Analytics (BPMA) device 202. The BPMA device 202 may be the same or similar to the computer system 102 as described with respect to FIG. 1. The BPMA device 202 may store one or more applications that can include executable instructions that, when executed by the BPMA device 202, cause the BPMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BPMA device 202 itself, may be located in virtual server(s) running in a cloud-based computing environment rather than being tied to one or more specific physical network computing devices. Also, the application(s) may be running in one or more virtual machines (VMs) executing on the BPMA device 202. Additionally, in one or more embodiments of this technology, virtual machine(s) running on the BPMA device 202 may be managed or supervised by a hypervisor.

In the network environment 200 of FIG. 2, the BPMA device 202 is coupled to a plurality of server devices 204(1)-204(n) that hosts a plurality of databases 206(1)-206(n), and also to a plurality of client devices 208(1)-208(n) via communication network(s) 210. A communication interface of the BPMA device 202, such as the network interface 114 of the computer system 102 of FIG. 1, operatively couples and communicates between the BPMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BPMA device 202, the server devices 204(1)-204(n), and/or the client devices 208(i)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and BPMA devices that efficiently implement a method for facilitating an audit of a business process in an event-based microservices environment via an independent auditor microservice.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BPMA device 202 may be a standalone device or integrated with one or more other devices or apparatuses, such as one or more of the server devices 204(1)-204(n), for example. In one particular example, the BPMA device 202 may include or be hosted by one of the server devices 204(1)-204(n), and other arrangements are also possible. Moreover, one or more of the devices of the BPMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BPMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to published events, correlation identifiers, and known business process notations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the BPMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the BPMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the BPMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BPMA device 202, the server devices 204(1)-204(n), or the client devices 208(1)-208(n), for example, may be configured to operate as virtual instances on the same physical machine. In other words, one or more of the BPMA device 202, the server devices 204(1)-204(n), or the client devices 208(1)-208(n) may operate on the same physical device rather than as separate devices communicating through communication networks) 210. Additionally, there may be more or fewer BPMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
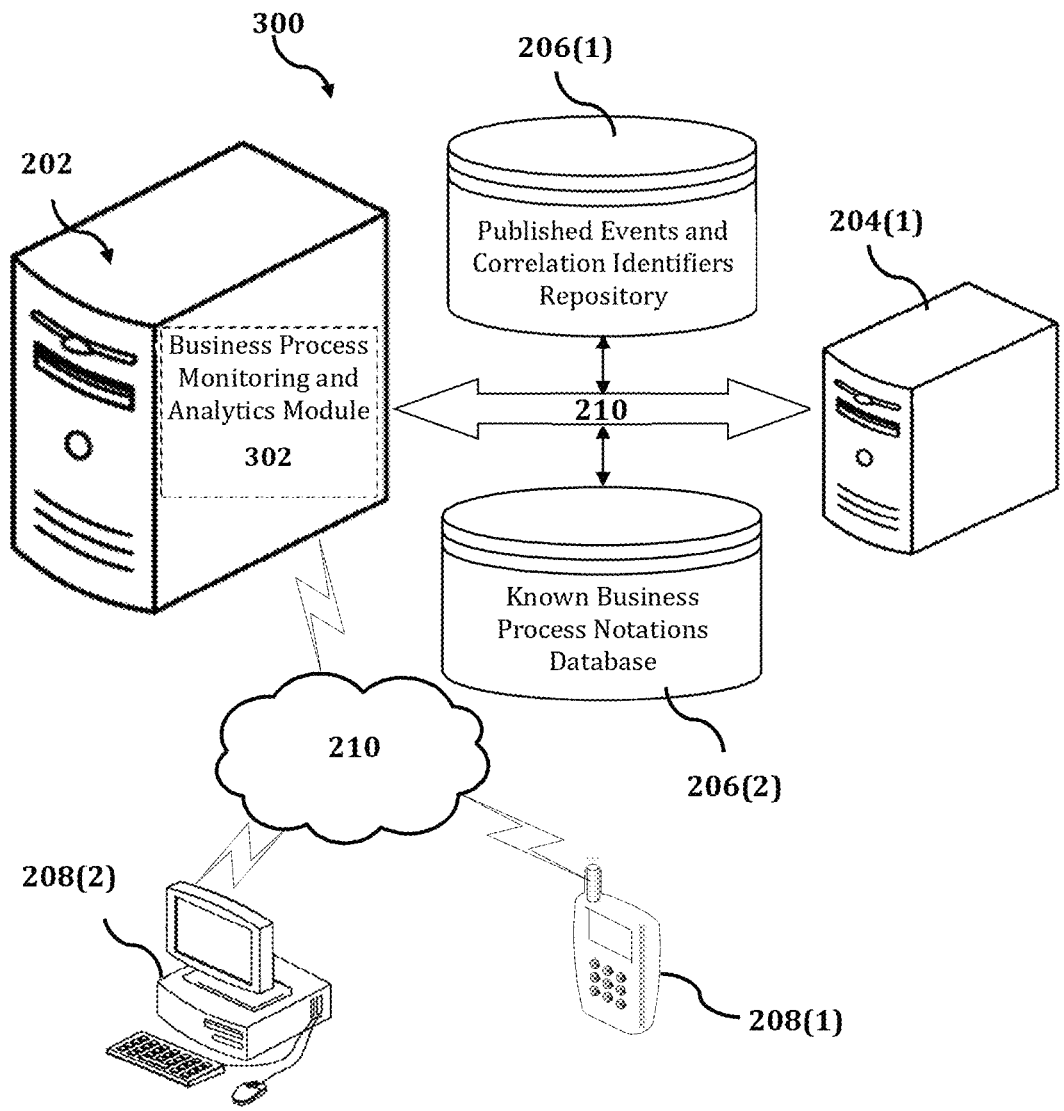
FIG. 3 shows an exemplary system for implementing a method for facilitating an audit of a business process in an event-based microservices environment via an independent auditor microservice.

The BPMA device 202 is described and shown in FIG. 3 as including a business process monitoring and analytics module 302, although it may include other rules, policies, modules, databases, or applications, for example. As will be described below, the business process monitoring and analytics module 302 is configured to implement a method for facilitating an audit of a business process in an event-based microservices environment via an independent auditor microservice.

An exemplary process 300 for implementing a mechanism for facilitating an audit of a business process in an event-based microservices environment via an independent auditor microservice by utilizing the network environment of FIG. 2 is shown as being executed in FIG. 3. Specifically, a first client device 208(1) and a second client device 208(2) are illustrated as being in communication with BPMA device 202. In this regard, the first client device 208(1) and the second client device 208(2) may be "clients" of the BPMA device 202 and are described herein as such. Nevertheless, it is to be known and understood that the first client device 208(1) and/or the second client device 208(2) need not necessarily be "clients" of the BPMA device 202, or any entity described in association therewith herein. Any additional or alternative relationship may exist between either or both of the first client device 208(1) and the second client device 208(2) and the BPMA device 202, or no relationship may exist.

Further, BPMA device 202 is illustrated as being able to access a published events and correlation identifiers repository 206(1) and a known business process notations database 206(2). The business process monitoring and analytics module 302 may be configured to access these databases for implementing a method for facilitating an audit of a business process in an event-based microservices environment via an independent auditor microservice.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the BPMA device 202 via broadband or cellular communication. Of course, these embodiments are merely exemplary and are not limiting or exhaustive.

Upon being started, the business process monitoring and analytics module 302 executes a process for facilitating an audit of a business process in an event-based microservices environment via an independent auditor microservice. An exemplary process for facilitating an audit of a business process in an event-based microservices environment via an independent auditor microservice is generally indicated at flowchart 400 in FIG. 4.

Figure 4:
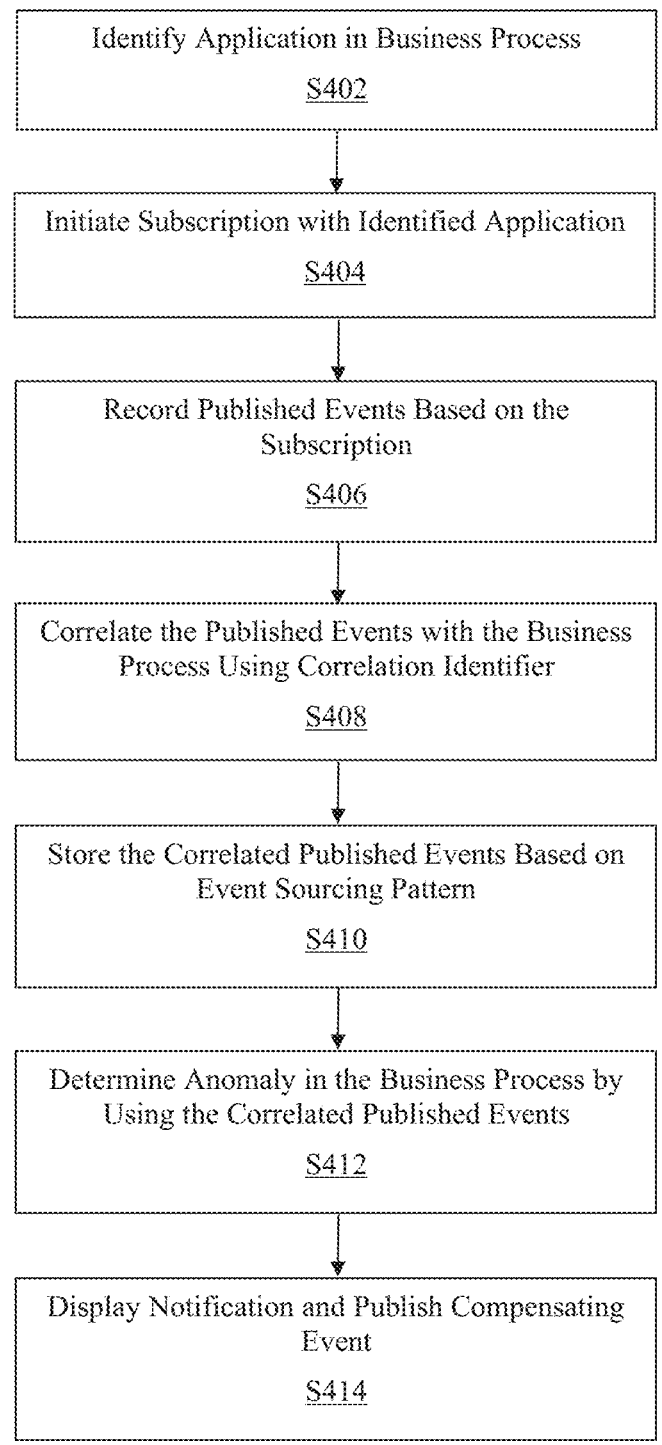
FIG. 4 is a flowchart of an exemplary process for implementing a method for facilitating an audit of a business process in an event-based microservices environment via an independent auditor microservice.

In the process 400 of FIG. 4, at step S402, at least one application in the event-based business process may be identified. The business process may include a collection of related and structured tasks that, when performed in a specific sequence, provide a service for a particular customer in an exemplary embodiment, the business process may be decomposed into a set of interactions that can be implemented in a distributed architecture such as, for example, a microservices architecture.

In another exemplary embodiment, a business transaction in a microservice architecture may need to span multiple services as part of a given business process. Each service may represent a specific step in the business process and each service may have a corresponding business logic as well as a corresponding storage component where the service state may be persisted.

In another exemplary embodiment, the business process may be represented by a Business Process Modeling Notation (BPMN). The BPMN may include a graphical representation usable for specifying business processes in a business process model. In another exemplary embodiment, the business process notation may include a sequence of events that must be emitted for the successful completion of the business process, a Service Level Agreement (SLA) of each event being emitted in the business process, a Service Level Objective (SLO) of each event being emitted in the business process, a SLA for the completion of the business process, and a SLO for the completion of the business process. The SLA/SLO for the completion of the business process may include a known terminating point of the business process such as, for example, receipt of the last event in a business process sequence.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art each microservice in a microservice choreography performs corresponding actions independently and does not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the microservice application may include an aggregate. The aggregate may include a plurality of objects that perform a business use case. In another exemplary embodiment, the aggregate may be fundamental to creating loosely coupled services. The aggregate may represent a cohesive group of objects that work together and must remain consistent with one another to successfully fulfill the business use case. The aggregate may be integral in a microservice architecture to ensure transactional consistency by ensuring that all objects within the aggregate are adequately up to date. For example, at the end of a committed transaction, the aggregate and all the objects within the aggregate should be completely up to date to ensure that the aggregate is ready to be used for the next use case.

At step S404, a subscription with the identified application may be initiated. The processor may subscribe to events from an event streaming environment such as, for example, a KAFKA event streaming environment. In an exemplary embodiment, the processor may also retrieve event data from additional sources such as, for example, a core processing layer in the same networked environment. Then, at step S406, at least one published event may be recorded based on the subscription.

In another exemplary embodiment, the published event may include a transition in operating state of the application in the event-based business process. The events may be published from microservices that are performing functions as a part of the overall business process. For example, when the microservices perform their functions, the microservices may change the state of their aggregate and subsequently publish a domain event. The event may represent a state change to a domain aggregate such as, for example, whenever the microservice creates and/or updates a critical business object.

In another exemplary embodiment, the published event may include an event identifier. The event identifier may include an immutable value such as, for example, a universally unique identifier (UUID) that uniquely represents the event. In another exemplary embodiment, the event identifier may be included in the header of the published event and may be utilized to identify duplicate published events. For example, while most message brokers guarantee the delivery of at least one message, a failure in the business process may result in the publishing of multiple messages. In this situation, the unique event identifier for the event would appear on each of the messages and may be utilized to detect the duplication.

At step S408, the recorded published event may be correlated with the event-based business process by using a correlation identifier. The correlation identifier may include a value that references an event chain. In an exemplary embodiment, a correlation identifier may correlate tasks that belong to the same domain-level operation such as, for example, in the business process domain-level.

In another exemplary embodiment, the event-based business process may include a saga transaction. The first transaction in a saga transaction may be initiated by an external request and each subsequent transaction in the saga transaction may be triggered by the completion of the previous transaction. The saga transaction may include a long-running transaction that utilizes an asynchronous messaging technique to execute a sequence of local transactions.

In another exemplary embodiment, the saga transaction may be defined according to a high-level business process where each step may be executed as a request and/or a command to a single service with a corresponding update to the state of that service. The use of messaging may ensure that all of the steps are executed and allows for participants in a saga transaction to be loosely coupled. In another exemplary embodiment, saga transactions may not be automatically rolled back as each step commits changes to an associated service's database. Each request in the saga transaction may have a compensating request that can be executed in the event of a failure. In another exemplary embodiment, the compensating requests may undo the transaction in progress by restoring the application's state to a corresponding state before the request was made. The compensable transactions are those transactions that are followed by steps in the saga transaction that can fail. Not all steps such as, for example, a read-only step in the saga transaction need a compensating transaction.

In another exemplary embodiment, a saga pattern may be utilized to execute a forward transaction and to execute a forward compensating transaction for the saga transaction. A saga pattern may be used by a processor to execute the sequence of steps that must be completed to address the challenges of data consistency without having to use a two-phase commit protocol. In another exemplary embodiment, a two-phase commit protocol may block a transaction such that the object is locked until the transaction completes. The two-phase commit protocol may cause two transactions to mutually lock each other such that each transaction requests a lock on a resource that the other transaction requires.

In another exemplary embodiment, the saga pattern may ensure data consistency in a microservice architecture as well as manage failures within the business process via compensating actions. The saga pattern may include at least one from among a choreography pattern and a coordination pattern.

At step S410, the correlated published event may be stored in a memory based on an event sourcing pattern. In an exemplary embodiment, the event sourcing pattern may include a data storage technique that enables reconstruction of an operating state of the application based on the recorded published event. The event sourcing pattern may include a method of storing an application's state through the history of events that have already happened. The application's state may be reconstructed based on the full history of events such that each event represents a state change.

At step S412, at least one anomaly in the event-based business process may be determined by using the correlated published event. The anomaly may include a deviation from a known or expected business process notation such as, for example, a data inconsistency resulting from the receipt of an alphabetical character in place of an expected numerical character for a user's account number.

At step S414, a notification that includes information relating to the anomaly and a recommended compensation action may be displayed via a graphical user interface. The notification may include any one or more of a visual notification such as, for example, a textual notification on the user interface, an audible notification such as, for example, a sound played via speakers connected to a user device, and a tactile notification such as, for example, a vibration via a vibrating element of a user device.

In an exemplary embodiment, the notification may include information relating to the anomaly such as, for example, information relating to the specific failure point in the business process. In another exemplary embodiment, the notification may include a recommended compensation action such as, for example, a recommended compensation action that would resolve the anomaly. The recommended compensation action may be retrieved from a repository based on the anomaly as well as automatically determined by the processor using the published events. In another exemplary embodiment, the textual notification may include, for example, selectable elements relating to disposition of the notification, selectable elements relating to options for the recommended compensation action, and selectable elements relating to authorization of the recommended compensation action.

In another exemplary embodiment, a compensating event corresponding to the recommended compensating action may be automatically published to the application to resolve the anomaly. The compensating event may be published automatically without human intervention based on predetermined criteria. In another exemplary embodiment, the compensating requests may undo the transaction in progress by restoring the application's state to an initial state before the request was made. The compensable transactions are those transactions that are followed by steps in the saga transaction that can fail. Not all steps such as, for example, a read-only step in the saga transaction need a compensating transaction.

In another exemplary embodiment, the processor may include an Auditor saga controller service (SCS) for saga transactions. When the transaction is initiated, the Auditor SCS may be triggered and the order management service (OMS) may move a corresponding aggregate to a corresponding first state to publish the first event in the saga. The Auditor SCS may listen for subsequent events that make up the saga as events are published by the participants in the Saga. Then, the Auditor SCS may execute corresponding command events and publish an event for each step in the saga. Each published event may include sufficient detail in the event header and payload such that appropriate action may be determined by the saga participants. In another exemplary embodiment, the Auditor SCS may include an autonomous application that exhibits all non-functional requirements related to resiliency. The Auditor SCS must be able to resume at a point in time it last operated successfully and, in the event of a failure with the Auditor SCS itself, does not affect or stop the business process.

In another exemplary embodiment, the logic of the saga coordination may be localized in the Auditor SCS. To avoid centralizing too much logic in the saga coordinator, the Auditor SCS may not contain any business logic that is not saga-related. For example, the Auditor SCS would not contain logic identifying the minimum eGiftcard order amount, or the max number of times an order can be made as that logic would be encoded in the OMS. By confining the long running transaction logic to the Auditor SCS, the software engineering of each purpose-built microservice supporting the long-running transaction may be simplified because each microservice is only responsible for their piece of the overall saga's state. The saga coordinator may manage the overall state of the saga, but every other service in the saga may manage only what is bounded by the role of that microservice.

By using the Auditor SCS to manage the saga and initiate compensating actions, participating services in the long-running transaction may be buffered from failures. This approach may enhance the speed of developing microservices as the development process may be shortened because microservice developers do not need to predict all the failure scenarios for long-running transactions and do not need to design complicated test cases. When a failure does occur, the Auditor SCS may or may not perform the compensating actions. The Auditor SCS knows when compensating actions must be taken and may publish events that are then consumed by the other services that execute compensating actions directly.

In another exemplary embodiment, the Auditor SCS may be used any time a saga is utilized such as, for example, for any long-running transactions that spans two or more services without a boundary-crossing state machine. As such, each operation that is specified within the business process such as, for example, creating an order, updating an order, and scheduling an order must have a corresponding saga encoded into the Auditor SCS. Accordingly, the Auditor SCS may have logic for one-to-many Sagas.

Figure 5:
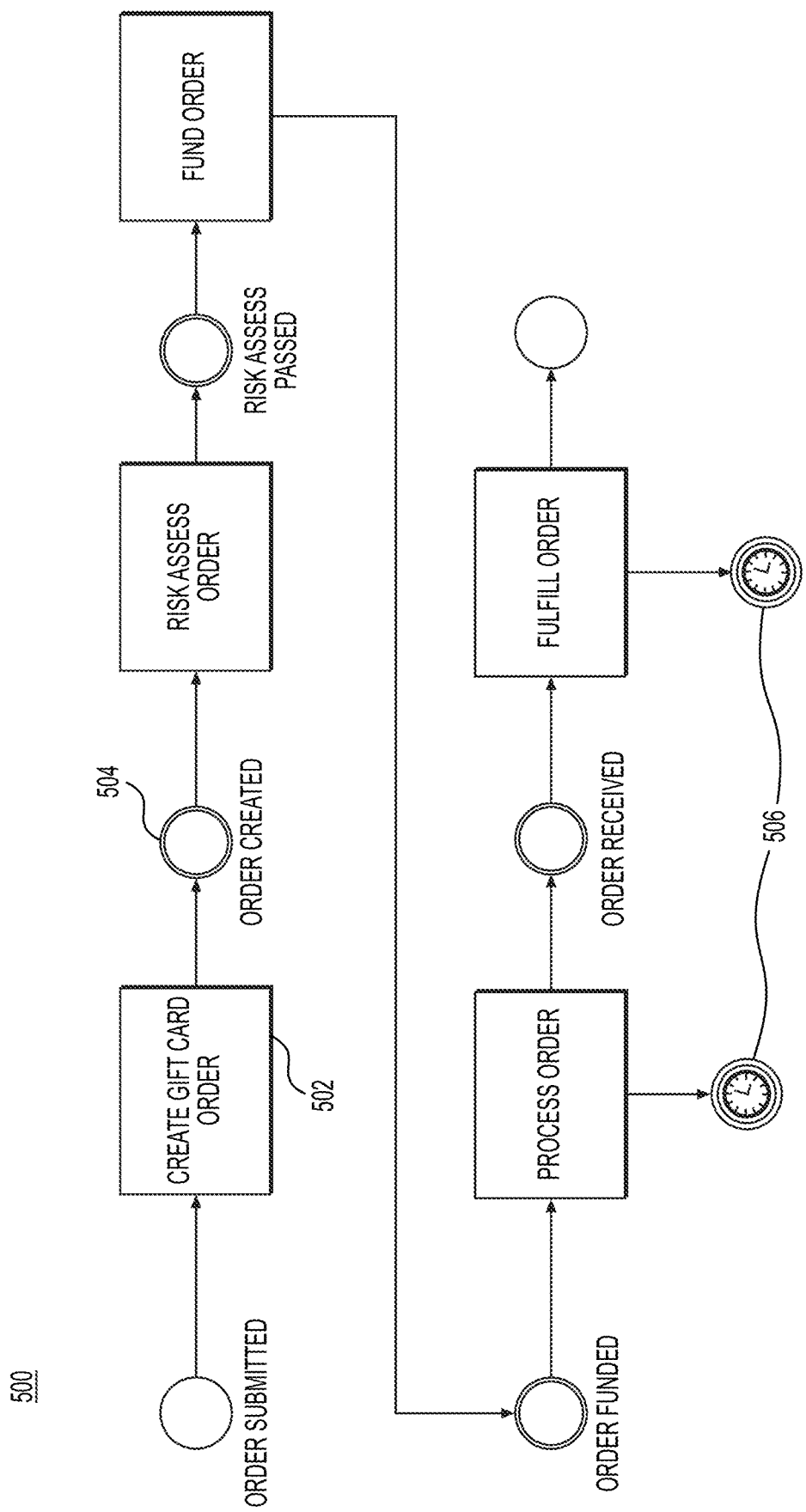
FIG. 5 is a business process modeling notation that illustrates an exemplary business process that is usable in a method for facilitating an audit of the business process in an event-based microservices environment via an independent auditor microservice, according to an exemplary embodiment.

FIG. 5 is a business process modeling notation (BPMN) that illustrates an exemplary business process 500 that is usable in a method for facilitating an audit of the business process in an event-based microservices environment via an independent auditor microservice, according to an exemplary embodiment. The BPMN may be used to define the business process and may include defined tasks 502, events 504, and service level agreements (SLA)/service level objectives (SLO) 506. The tasks 502 include create gift card order, risk assess order, fund order, process order, and fulfill order. The events 504 include order created risk assess passed, order funded, and order received. Each task depicted in FIG. 5 represents a separate microservice, and each event represents the state change of the aggregate.

As illustrated in FIG. 5, the processor applies logic based upon the encoding of the business process to ensure that events are received in the right sequence. Additionally, the processor ensures that there are no SLA breaches between events as well as no SLA breach in the execution of the overall business process. The outcome of this auditing is the publishing of the events needed to communicate a successful completion as well as any anomalies observed. The outputs may be provided as published events via a stream processing platform such as, for example, a KAFKA platform for other microservices to consume and take further action as defined by the business process.

Figure 6:
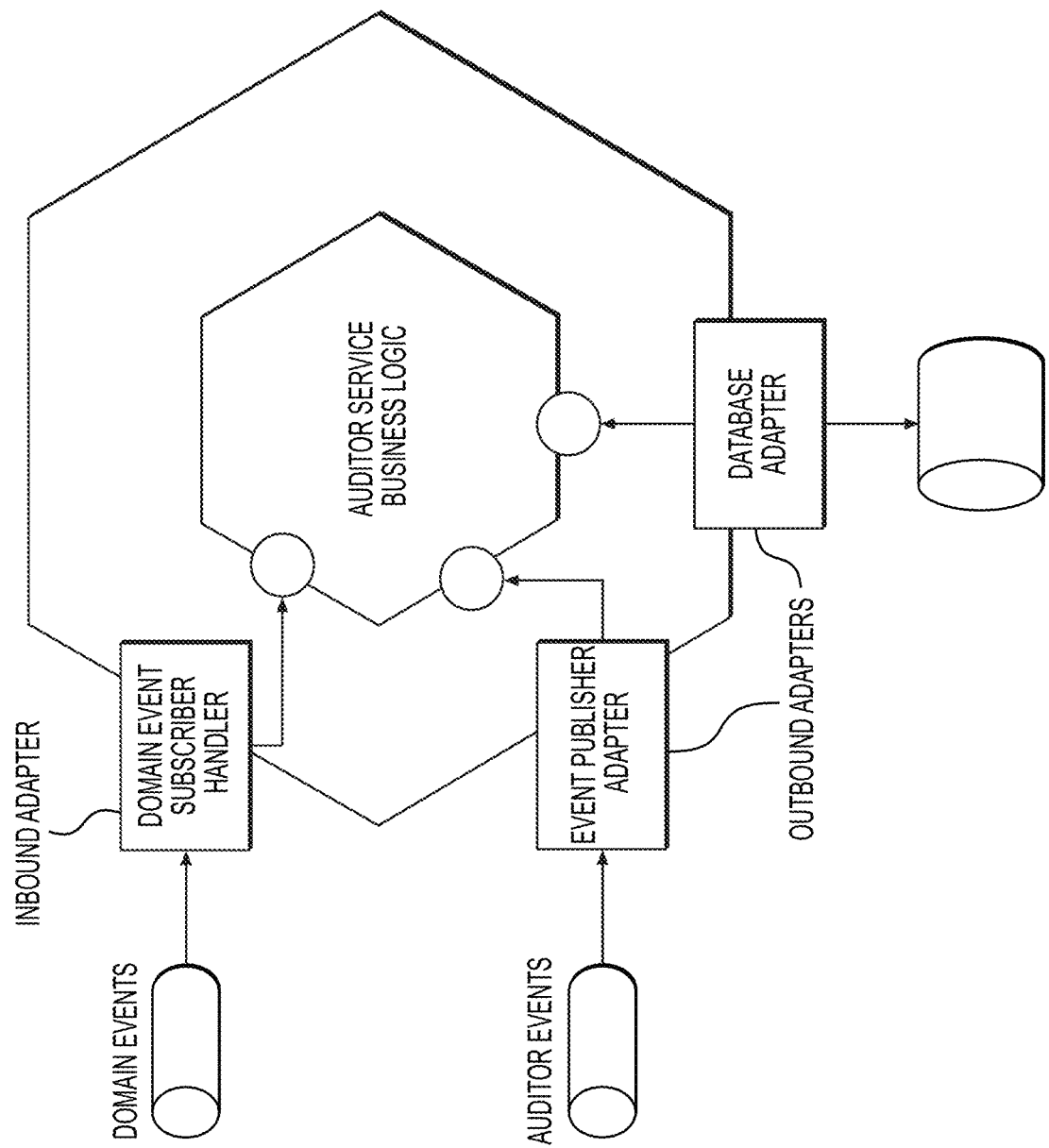
FIG. 6 is a diagram of an exemplary architecture for implementing a method for facilitating an audit of a business process in an event-based microservices environment via an independent auditor microservice.

FIG. 6 is a diagram of an exemplary architecture 600 for implementing a method for facilitating an audit of a business process in an event-based microservices environment via an independent auditor microservice. In FIG. 6, the business logic is the core of a hexagonal architecture that is based on three principles. The principles include 1) explicitly separate application, domain, and infrastructure, 2) move dependencies from application and infrastructure to the domain, and 3) isolate the boundaries by using ports and adapters.

As illustrated in FIG. 6, the business logic, which may include the encoded business process from FIG. 5, is surrounded by inbound adapters and outbound adapters. The inbound adapter may consume domain events that other microservices publish to communicate an aggregate state change. The outbound adapter may publish events noting what the processor has observed including any detected anomalies. Additionally, there may also be a database adapter, which is an outbound adapter that accesses the database. Construction of the hexagonal architecture also includes a data store such as, for example, a CASSANDRA key space for storing the domain events that have been consumed. The data store may hold events for a defined time period in addition to a predetermined buffer time. Events may be purged or archived once the execution of the business process is deemed to be successful unless events need to be held longer based on a predetermined requirement.

Figure 7:
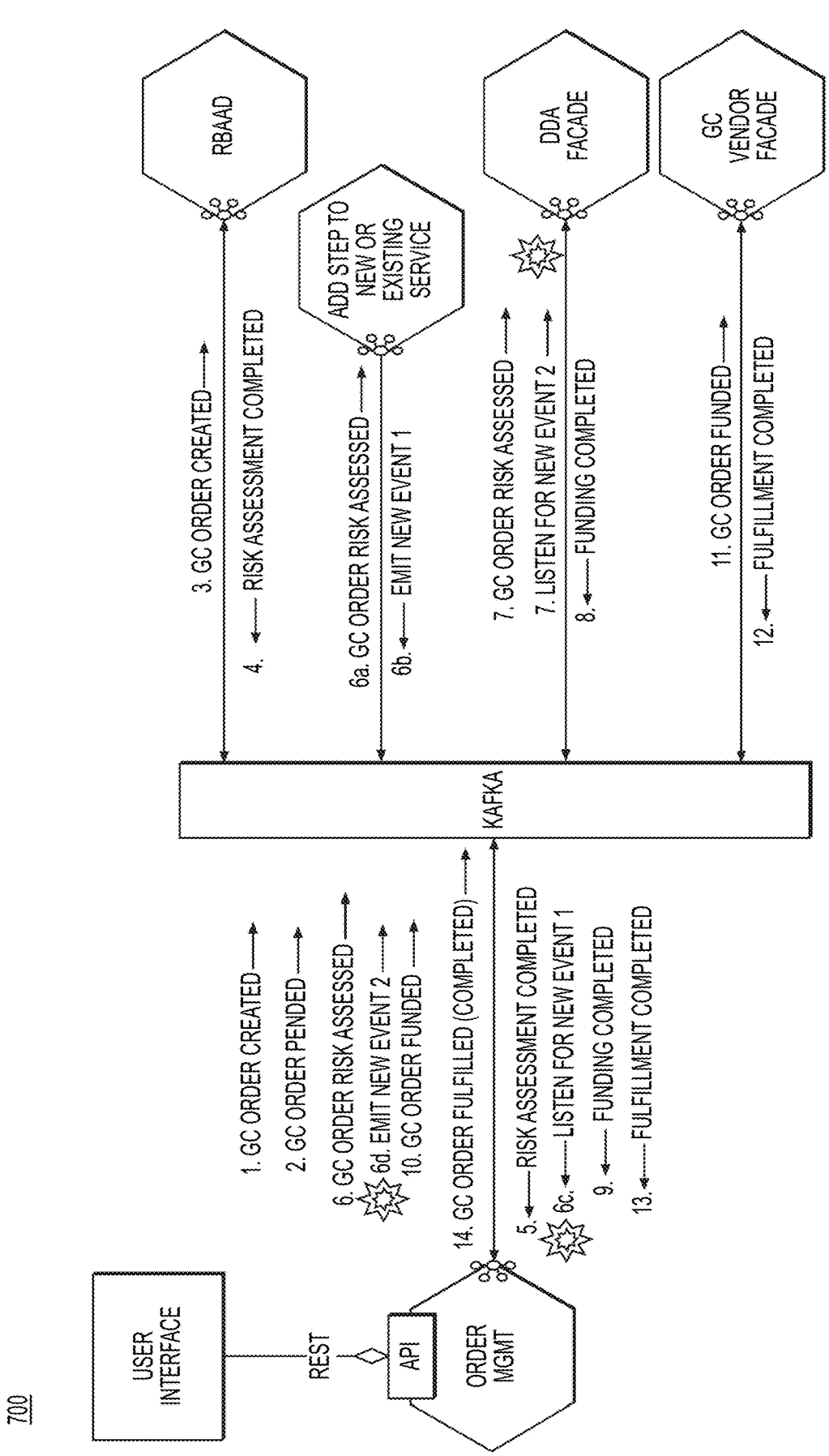
FIG. 7 is a diagram of an exemplary saga choreography for implementing a method for facilitating an audit of a business process in an event-based microservices environment via an independent auditor microservice.

FIG. 7 is a diagram of an exemplary saga choreography 700 for implementing a method for facilitating an audit of a business process in an event-based microservices environment via an independent auditor microservice. In the saga choreography, there is no central coordination of the Saga such that each service that is participating in the Saga subscribes to the other services' events and takes action as necessary. In this approach, each service must subscribe to all events that affect their aggregate.

As illustrated in FIG. 7, customer enters details for the gift card, and selects PLACE ORDER. The gift card (GC) Order service at 1 creates the ORDER, with a state of ORDER PENDING at 2, and publishes the "Gift Card Order Created" state change event at 3. The Risk service consumes the "Gift Card Order Created" state change event, assesses the order for fraud, then publishes the "Gift Card Order Assessed" state change event at 4-6. The Funding service consumes the "Gift Card Order Assessed" state change event at 7, determines whether the gift card can be funded from the customer's checking account, then publishes the "Gift Card Order Funded" state change event at 8-10. The Fulfillment service consumes the "Gift Card Order Funded" state change event at 11, fulfills the order by sending the eGiftCard to the recipient, and publishes the "Gift Card Order Fulfilled" state change event at 12. The GC Order service consumes the "Gift Card Order Fulfilled" state change event at 13 and moves the state of the order to ORDER COMPLETE.

In pure choreography, the services run completely autonomous, but changes to the end-to-end (E2E) process such as, for example, adding a step between Risk Assessment and Funding require changes to multiple services to update events listened to, events emitted, and the resulting actions taken by those services in addition to work required to add the new step.

Figure 8:
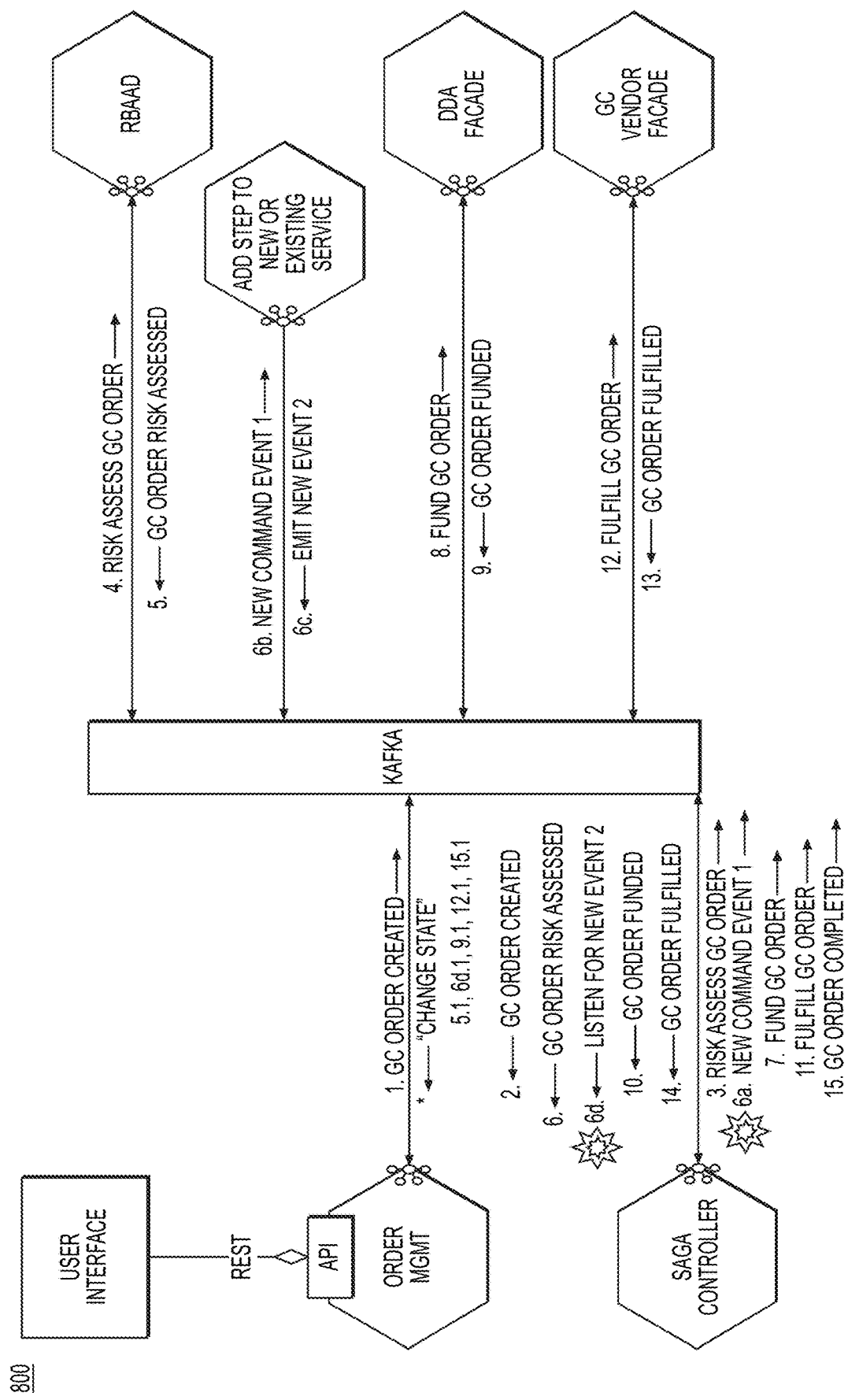
FIG. 8 is a diagram of an exemplary saga coordination for implementing a method for facilitating an audit of a business process in an event-based microservices environment via an independent auditor microservice.

FIG. 8 is a diagram of an exemplary saga coordination 800 for implementing a method for facilitating an audit of a business process in an event-based microservices environment via an independent auditor microservice. In saga coordination, there is a primary service such as, for example, the Saga Coordinator Service (SCS) that is coordinating the saga. The SCS is responsible for running actions based on a defined saga and monitors for failures on any of those actions. The SCS is also responsible for triggering compensating actions when necessary. As such, the SCS has the responsibility of determining which step in the Saga must be performed next. The SCS uses events to communicate with the services that are participating in the Saga. This communication ensures loose coupling as there is no dependency among the services participating in the Saga such that each service is unaware of the other participating services.

As illustrated in FIG. 8, Customer enters details for the gift card, and selects PLACE ORDER. The GC Order service creates the ORDER, with a state of PENDING, and publishes the state event "Gift Card Order Created" at 1. The Saga Controller Service consumes this event at 2 and publishes the "Risk Assess Gift Card Order" command event at 3. The Risk service consumes the "Risk Assess Order" command event at 4, assesses the order for fraud, then publishes the "Order Assessed" state change event at 5. The Saga Controller Service consumes this event at 6 and publishes the command event "Change State." The GC Order service consumes the "Change State" event, updates the state of the ORDER to IN PROGRESS, then publishes the "Gift Card Order Processed."

The Saga Controller Service consumes this event and publishes the "Fund Order" command event at 7. The Funding service consumes the "Fund Order" command event at 8, determines whether the gift card can be funded from the customer's checking account, then publishes the "Order Funded" state change event at 9. The Saga Controller Service consumes this event at 10 and publishes the command event "Change State." The GC Order service consumes the event, updates the state of the ORDER to IN FULFILLMENT, then publishes the "Gift Card Order Processed." The Saga Controller Service consumes this event and publishes the "Fulfill Order" command event at 11. The Fulfillment service consumes the "Fulfill Order" command event at 12, fulfills the order by sending the eGiftCard to the recipient, and publishes the "Order Fulfilled" state change event at 13. The Saga Controller Service consumes this event at 14 and publishes the command event "Change State." The GC Order service consumes the event and moves the state of the order to ORDER COMPLETE and publishes the "Gift Card Order Complete" event at 15. The Saga Controller Service consumes this event and "marks" the saga as complete.

With a Saga Controller, the individual services run autonomously and adding a step between Risk Assessment and Funding, for example, would only require a change to the Saga Controller and to the service facilitating the new step. All other services are unaffected by the new steps. Additionally, the Saga Controller emits the status of the end-to-end (E2E) Saga.

Figure 9:
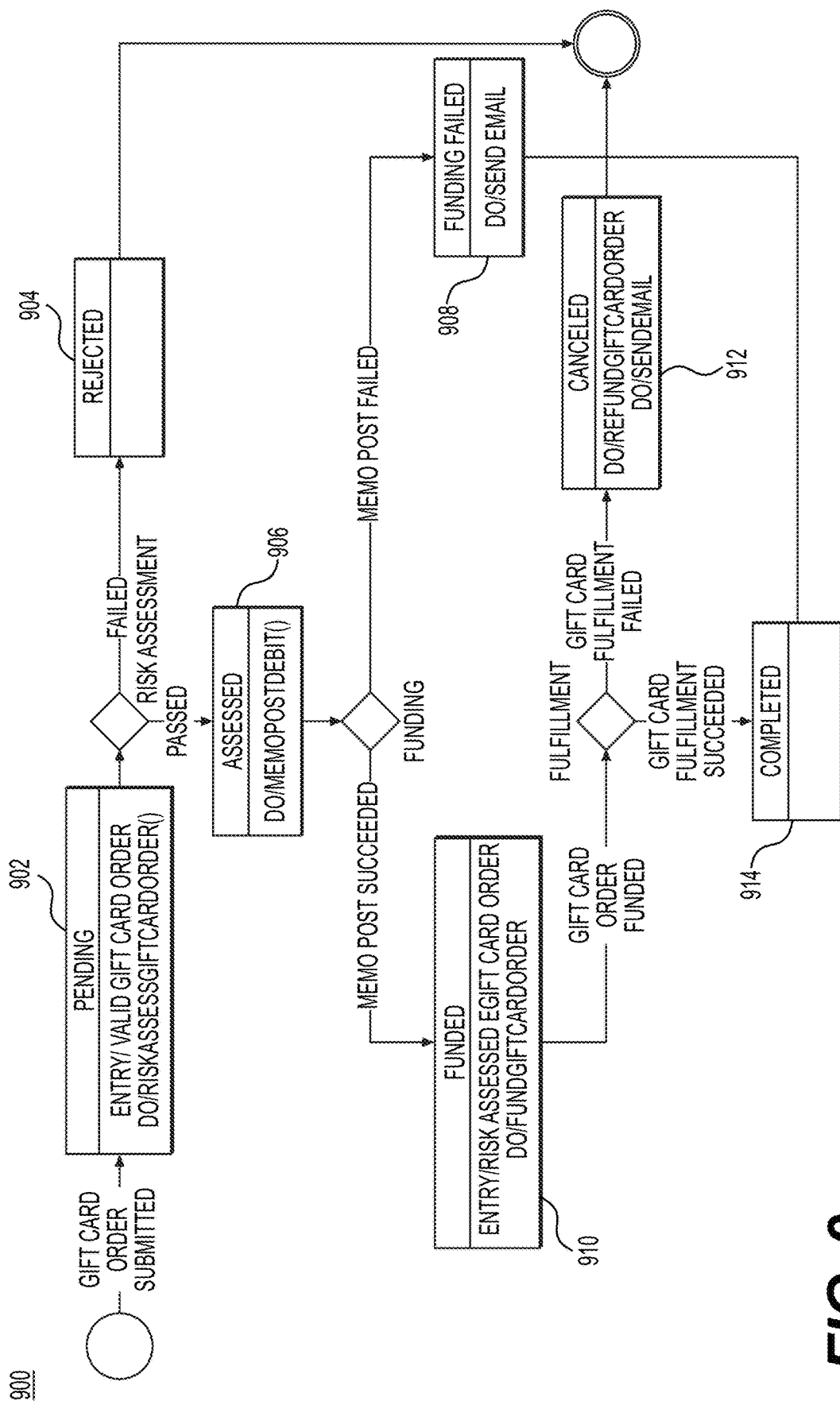
FIG. 9 is a flow diagram of an exemplary state machine for implementing a method for facilitating an audit of a business process in an event-based microservices environment via an independent auditor microservice.

FIG. 9 is a flow diagram of an exemplary state machine 900 for implementing a method for facilitating an audit of a business process in an event-based microservices environment via an independent auditor microservice. In an exemplary embodiment, the Saga coordinator may be modeled as a state machine. The state machine includes the states and the transitions between states, and also includes a sequence for compensating transactions.

As illustrated in FIG. 9, the exemplary business process begins with the submission of a gift card order. The gift card order is then received by a pending task 902 which receives a valid gift card order and performs risk assessments for the gift card order. When the risk assessment fails, the process moves to a rejected task 904 which ensures completion of the business process. However, when the risk assessment passes, the process moves to an assessed task 906 which performs memo post debit functions. When the memo post fails, the process moves to a funding failed task 908 which may send a notification email and ensures completion of the business process. However, when the memo post succeeds, the process moves to a funded task 910 which receives the risk assessed gift card order and funds the gift card order. When a gift card fulfillment fails, the process moves to a canceled task 912 which refunds the gift card order, sends a notification email, and ensures completion of the business process. However, when the gift card fulfillment succeeds, the process moves to a completed task 914 which then ensures completion of the business process.

The long-running transaction is broken down into multiple steps and the completion of each step results in a state transition. An event is then published when the state of a service has transitioned. In Domain Driven Design (DDD), this pattern means that the Saga creates or updates one aggregate. The Saga has the overall responsibility to ensure that this transaction is fully executed such that all of the states are successfully transitioned. When a step cannot move to its next state such as, for example, in case of any errors, a rollback is applied. The rollback occurs by calling the steps to be compensated in reverse order.

Figure 10:
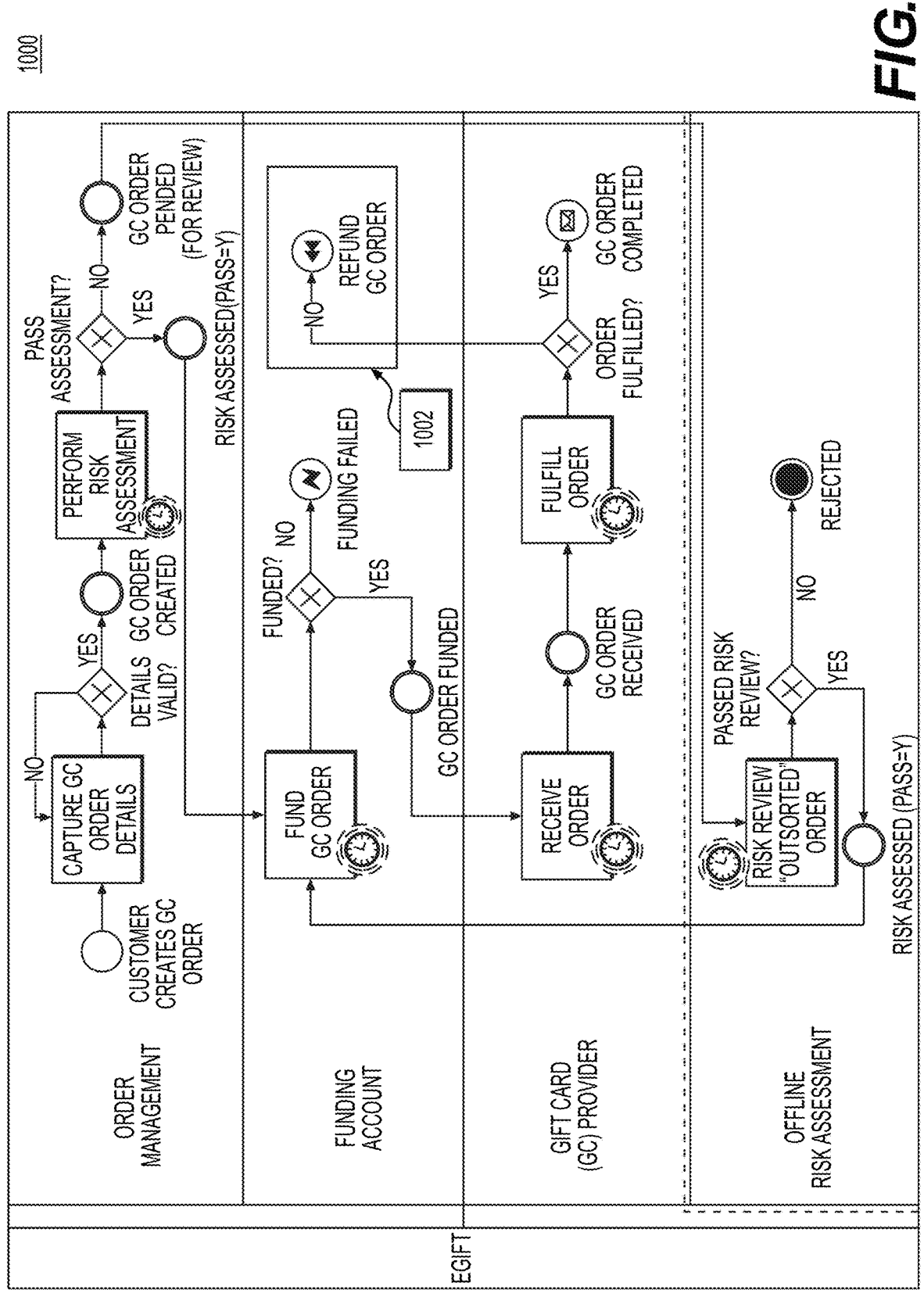
FIG. 10 is a flow diagram of an exemplary compensating action that is usable in a method for facilitating an audit of a business process in an event-based microservices environment via an independent auditor microservice.

FIG. 10 is a flow diagram of an exemplary compensating action 1000 that is usable in a method for facilitating an audit of a business process in an event-based microservices environment via an independent auditor microservice. The Auditor SCS determines whether a long-running transaction such as, for example, the Saga across multiple microservices is functioning as required. By encoding the Saga into the Auditor logic, the Auditor SCS can look across microservices and other services that are publishing events via facades to give a complete picture of the transaction. The Auditor SCS can also initiate actions to be taken when something fails in the execution of that long-running transaction.

The Auditor SCS not only observes, but also directs steps in the Saga to ensure that the steps occur in the right sequence within defined SLAs. When an anomaly is observed, the Auditor SCS publishes an event t may be used to trigger a compensating action for the Saga participants. Compensatable transactions in a Saga are those transactions that can be rolled back to a previous state or even rolled back to a new state. Using eGiftCard as an example, when the fulfillment step in the Saga cannot be successfully completed, the Auditor SCS may consume the FULFILLMENT FAILED event, and may subsequently publish an event for the Funding service to rollback its transaction and take action to refund the consumer.

Additionally, a point-of-no-return for the transaction such as, for example, a point at which the transaction can no longer be compensated must be identified. The point-of-no-return may be referred to as the Pivot transaction. Once this step in the Saga completes, the Saga can only go forward to completion. The system y be designed so that Auditor SCS events are used to trigger automated compensating actions, therefore, along with the encoding of the end-to-end business process success scenarios and the steps that make up the Saga, the Auditor SCS must also be encoded to identify steps for which compensating actions are needed.

As illustrated in FIG. 10, the eGift business process includes separate functions that include an offline risk assessment function, a Gift Card (GC) provider function, a funding account function, and an order management function. In the order management function, a customer creates a GC order, GC order details are captured and assessed for validity, a GC order is created, and a risk assessment is performed. Then, in the funding account function, the GC order is funded. In the GC provider function, the order is received and fulfilled. When the order is fulfilled successfully, the GC order business process is completed. However, when the GC order is not successfully fulfilled, a compensating action 1002 to refund the GC order to the customer may be initiated at the funding account function. The eGift business process may incorporate an offline risk assessment function that performs a risk review of sorted out orders and either returns the orders back for funding when the review is successful or ensures completion of the business process when the review fails.

Accordingly, with this technology, an optimized process for facilitating an audit of a business process in an event-based microservices environment via an independent auditor microservice is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law; the scope of the present disclosure is to be determined by the broadest permissible interpretation of the following claims and their equivalents, and shall not be restricted or limited by the foregoing detailed description.

What is claimed is:

1. A method for facilitating an audit of an event-based business process, the method being implemented by at least one processor, the method comprising:
identifying, by the at least one processor, at least one application in the event-based business process;
initiating, by the at least one processor, a subscription with the identified at least one application;
retrieving, by the at least one processor, event data that relates to the at least one application from a core processing layer of a corresponding networked environment;
recording, by the at least one processor, at least one published event based on the subscription, each of the at least one published event including a header section that contains a corresponding event identifier;
correlating, by the at least one processor using a correlation identifier, the recorded at least one published event with the event-based business process, the correlation identifier including a value that references an event chain; and
storing, by the at least one processor in a memory, the correlated at least one published event based on an event sourcing pattern,
wherein the correlated at least one published event is stored in the memory for a defined time period based on a predetermined requirement, the defined time period including a predetermined buffer time, and
wherein the predetermined requirement necessitates extended storage of the correlated at least one published event in the memory past successful execution of the event-based business process.

2. The method of claim 1, further comprising:
determining, by the at least one processor using the correlated at least one published event, at least one anomaly in the event-based business process;
automatically determining, by the at least one processor using the correlated at least one published event, a recommended compensating action to resolve the at least one anomaly; and
displaying, by the at least one processor via a graphical user interface, a notification that includes information relating to the at least one anomaly and the recommended compensating action.

3. The method of claim 2, wherein at least one compensating event corresponding to the recommended compensating action is automatically published to the at least one application to resolve the at least one anomaly.

4. The method of claim 1, wherein the event-based business process includes at least one saga transaction, the at least one saga transaction including a long-running transaction that utilizes an asynchronous messaging technique to execute a sequence of local transactions.

5. The method of claim 4, wherein at least one saga pattern is utilized to execute a forward transaction and to execute a forward compensating transaction for the at least one saga transaction, the at least one saga pattern including at least one from among a choreography pattern and a coordination pattern.

6. The method of claim 1, wherein the at least one application includes at least one from among a monolithic application and a microservice application, the microservice application including at least one aggregate.

7. The method of claim 6, wherein the at least one aggregate includes a plurality of objects that perform a business use case.

8. The method of claim 1, wherein the at least one published event includes a transition in operating state of the at least one application in the event-based business process.

9. The method of claim 1, wherein the at least one processor is encoded with at least one from among a predetermined sequence of events to complete the event-based business process, a service level agreement (SLA) of the at least one published event, a service level objective (SLO) of the at least one published event, a SLA for completing the event-based business process, and a SLO for completing the event-based business process.

10. The method of claim 1, wherein the event sourcing pattern includes at least one data storage technique that enables reconstruction of an operating state of the at least one application based on the recorded at least one published event.

11. A computing device configured to implement an execution of a method for facilitating an audit of an event-based business process, the computing device comprising:
a processor;
a memory; and
a communication interface coupled to each of the processor and the memory,
wherein the processor is configured to:
identify at least one application in the event-based business process;
initiate a subscription with the identified at least one application;
retrieve event data that relates to the at least one application from a core processing layer of a corresponding networked environment;
record at least one published event based on the subscription, each of the at least one published event including a header section that contains a corresponding event identifier;
correlate, by using a correlation identifier, the recorded at least one published event with the event-based business process, the correlation identifier including a value that references an event chain; and
store, in the memory, the correlated at least one published event based on an event sourcing pattern,
wherein the correlated at least one published event is stored in the memory for a defined time period based on a predetermined requirement, the defined time period including a predetermined buffer time; and
wherein the predetermined requirement necessitates extended storage of the correlated at least one published event in the memory past successful execution of the event-based business process.

12. The computing device of claim 11, wherein the processor is further configured to:
determine, by using the correlated at least one published event, at least one anomaly in the event-based business process;
automatically determine, by using the correlated at least one published event, a recommended compensating action to resolve the at least one anomaly; and
display, via a graphical user interface, a notification that includes information relating to the at least one anomaly and the recommended compensating action.

13. The computing device of claim 12, wherein the processor is further configured to automatically publish at least one compensating event to the at least one application to resolve the at least one anomaly, the at least one compensating event corresponding to the recommended compensating action.

14. The computing device of claim 11, wherein the event-based business process includes at least one saga transaction, the at least one saga transaction including a long-running transaction that utilizes an asynchronous messaging technique to execute a sequence of local transactions.

15. The computing device of claim 14, wherein the processor is further configured to utilize at least one saga pattern to execute a forward transaction and to execute a forward compensating transaction for the at least one saga transaction, the at least one saga pattern including at least one from among a choreography pattern and a coordination pattern.

16. The computing device of claim 11, wherein the at least one application includes at least one from among a monolithic application and a microservice application, the microservice application including at least one aggregate.

17. The computing device of claim 16, wherein the at least one aggregate includes a plurality of objects that perform a business use case.

18. The computing device of claim 11, wherein the at least one published event includes a transition in operating state of the at least one application in the event-based business process.

19. The computing device of claim 11, wherein the processor is further configured to encode at least one from among a predetermined sequence of events to complete the event-based business process, a service level agreement (SLA) of the at least one published event, a service level objective (SLO) of the at least one published event, a SLA for completing the event-based business process, and a SLO for completing the event-based business process.

20. The computing device of claim 11, wherein the event sourcing pattern includes at least one data storage technique that enables reconstruction of an operating state of the at least one application based on the recorded at least one published event.

* * * * *